United States Patent [19]

Hamasaki et al.

[11] Patent Number: 4,627,704

[45] Date of Patent: Dec. 9, 1986

[54] LIGHT AMOUNT LIMITING DEVICE OF ELECTROPHOTOGRAPHIC COPYING MACHINE

[75] Inventors: Hideaki Hamasaki; Shigeharu Maehara, both of Nara; Shinsuke Saita, Habikino, all of Japan

[73] Assignee: Sharp Kabushiki Kaisha, Osaka, Japan

[21] Appl. No.: 547,400

[22] Filed: Oct. 31, 1983

[30] Foreign Application Priority Data

Nov. 4, 1982 [JP] Japan .......................... 57-167691[U]

[51] Int. Cl.⁴ ...................... G03G 15/04; G03B 27/72

[52] U.S. Cl. ...................................... 355/3 R; 355/71

[58] Field of Search .................... 355/1, 3 R, 71, 14 E

[56] References Cited

U.S. PATENT DOCUMENTS

| | | | |
|---|---|---|---|
| 4,080,057 | 3/1978 | Nakane et al. | 355/71 X |
| 4,080,072 | 3/1978 | Failes | 355/71 X |
| 4,090,788 | 5/1978 | Massengeil | 355/71 |
| 4,176,943 | 12/1979 | Hasebe | 355/71 X |
| 4,193,679 | 3/1980 | Mochizuki et al. | 355/71 X |
| 4,248,517 | 2/1981 | Nishikawa | 355/71 X |
| 4,257,086 | 3/1981 | Gulliksen | 355/71 X |
| 4,290,690 | 9/1981 | Noda et al. | 355/71 X |
| 4,333,130 | 6/1982 | Mochizuki et al. | 355/71 X |
| 4,450,458 | 5/1984 | Araghi et al. | 346/155 |

*Primary Examiner*—Fred L. Braun
*Attorney, Agent, or Firm*—Birch, Stewart, Kolasch & Birch

[57] ABSTRACT

An electrophotographic copying machine including a device for limiting light emitted by a light source toward a copy document on a document table. The device includes a plurality of light limiting blades positioned along the length of the light source. The light source is positioned within a reflective bowl.

2 Claims, 4 Drawing Figures

LIGHT AMOUNT LIMITING DEVICE OF ELECTROPHOTOGRAPHIC COPYING MACHINE

BACKGROUND OF THE INVENTION

The present invention relates to an electrophotographic copying machine and, more particularly, to a device for limiting the amount of light passing to a copy document of the copying machine.

An electrophotographic copying machine produces an electrostatic latent image on an optical-sensitive member with an optical system. The latent image corresponds to an image on a copy document such as a manuscript or book to be copied. Toner particles are electrically adhered to the latent image, so that the latent image becomes visible to form a toner image. The toner image is transferred onto a copy paper via a transference charger.

conventionally, the optical system for directing a light image of the copy document onto the optical-sensitive member is constructed so that the copy document is exposed to light emitted by a light source and its reflected light is focused onto the optical-sensitive member by some lens. Part of the optical system for focusing the reflected light from the copy document onto the optical-sensitive member includes a device for limiting light passing to a copy document which is positioned between the copy document and the optical-sensitive member.

In controlling the light amount, the position of the device is altered. However, the conventional device cannot control the light amount precisely and uniformly over the surface of the optical-sensitive member. Further, the conventional device is rather long, so that the distance between the copy document and the optical-sensitive member becomes rather long, so that the copying machine is prevented from being compact. Accordingly, it is desired to provide an improved device.

SUMMARY OF THE INVENTION

Accordingly, it is an object of the present invention to provide an improved device for limiting the amount of light passing to a copy document of a copying machine.

Briefly described, in accordance with the present invention, an electrophotographic copying machine comprises a device for limiting the amount of light passing to a copy document on a document table. The device comprises a bowl, and a plate provided with a plurality of light limiting blades. A light source is positioned at the bottom of the bowl. The bowl reflects light generated by the light source toward the copy document through an opening of the bowl. The plurality of light limiting blades are provided on the plate for limiting the light reaching the copy document.

A rod lens array is positioned between the copy document and an optical-sensitive member. The rod lens array comprising a great number of rod lenses is characterized in that the refractive coefficients of the rod lenses are changed along the radius line of the rod lens array. The rod lens array focuses the light reflected by the copy document onto the optical-sensitive member.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE INVENTION

Figure 1:
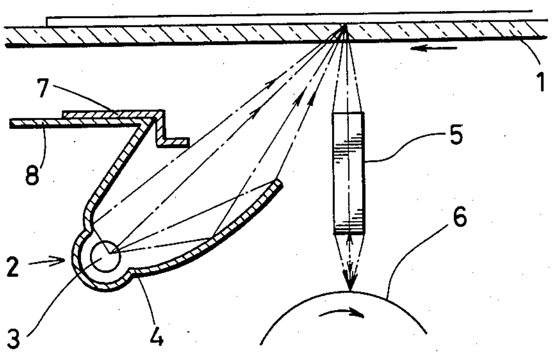
FIG. 1 shows a sectional view of an optical system comprising a light limiting device and a rod lens array in an electrophotographic copying machine according to the present invention.

FIG. 1 shows a sectional view of an optical system comprising a light limiting device and a rod lens array in an electrophotographic copying machine of the present invention. A type of electrophotographic copying machine for reciprocating a document table for carrying a copy document such as a manuscript or book is shown. However, it should be noted that the present invention can be applied to another type of electrophotographic copying machine comprising part of an optical scanning system moved along the document table.

Referring now to FIG. 1, the electrophotographic copying machine comprises a document table 1, a light source unit 2, a lamp 3, a bowl wall 4, a rod lens array 5, an optical-sensitive member 6, a plate 7, and a supporting plate 8. Although not shown in FIG. 1, there are provided in the copying machine a pre-charger, a developing section, a transference charger, and a paper supply section.

The document table 1 is position at the top of the copying machine. The table 1 can be reciprocated in the directions as shown by an arrow. On the table 1, a copy document such as a manuscript or book to be copied is mounted to which light is projected by the light source unit 2. The light source 2 comprises the lamp 3 and the bowl wall 4. The lamp 3 emits light toward the copy document. The bowl wall 4 is provided for reflecting the light emitted by the lamp 2 since the bowl wall 4 functions as a reflective wall.

The rod lens array 5 is used to focus reflected light from the copy document onto the optical-sensitive member 6. The rod lens array 5 comprises a great number of rod lenses arranged in a rod. For example, the diameter and the length of each one of the rod lenses are about 1.1 mm and 29.4 mm, respectively. This array 5 is characterized in that the refractive coefficients of the rod lenses are distributed and changed along the radius of the rod lens array. At the center of the rod lens array 5, the refractive coefficient of one of the rod lenses is the highest, and near the periphery of the rod lens array 5, the refractive coefficient of one of the rod lenses are smaller. Preferably, the diameter of the rod lens array 5 is about 0.5 to about 2.0 mm. The optical system with the rod lens array 5 does not need any mirror. Such a rod lens array is sold under the trade name "SELFOCLENS ARRAY" by NIHON ITA GLASS KABUSHIKI KAISHA, Japan.

The light source unit 2 is fixed while the table 1 is moved. Otherwise, it may be possible that part of the light source unit 2 is moved while the table 1 is fixed.

The optical-sensitive member 6 is formed around a drum. The pre-charger is provided for uniformly pre-charging the optical-sensitive member before the member receives the reflected image.

Responsive to the reflected light image from the copy document, an electrostatic latent image is formed on the optical-sensitive member 6. The developing section is provided for changing the latent image into visible toner image. The transference charger is provided for electrostatically transferring the toner image upon a copy paper which is picked up by a paper pick-up roller. An image fixing device is provided for fixing the toner image on the paper, so that the image on the copy document is copied on the paper.

After the toner image is transferred on the paper, the remaining charges on the optical-sensitive member 6 are removed by a charge-removal charger. A cleaner is provided for cleaning the toner particles remaining on the optical-sensitive member 6.

Figure 2:
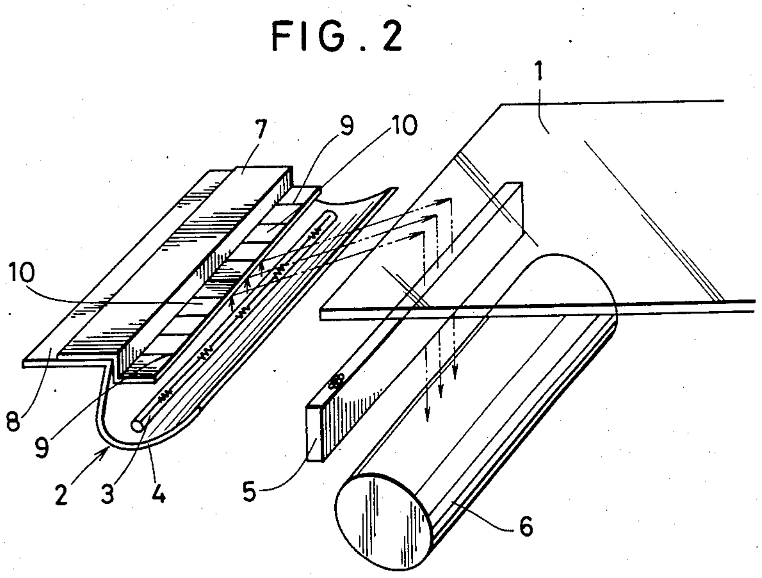
FIG. 2 shows a perspective view of the optical system of FIG. 1.

Referring now to FIG. 2, the plate 7 is provided with a plurality of light limiting blades 10 separated by a plurality of slits 9. The plurality of light limiting blades 10 can serve to interrupt the light emitted by the lamp 3 toward the copy document. The plate 7 opposing the section including the plurality of blades 10 is supported on the plate 8. The plurality of blades 10 are positioned at the opening of the bowl wall 4.

The rod lens array 5 is positioned parallel to the light source unit 2, the plurality of blades 10, and the longitudinal side of the drum carrying the optical-sensitive member 6.

Figure 3:
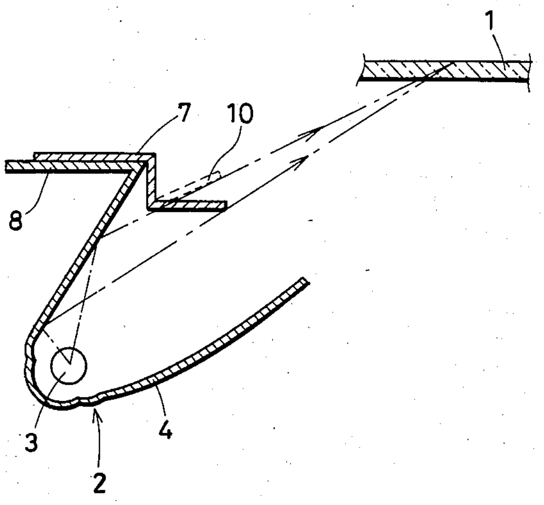
FIG. 3 shows a sectional view of the light limiting device of the present invention, showing the light limiting principle.
Figure 4:
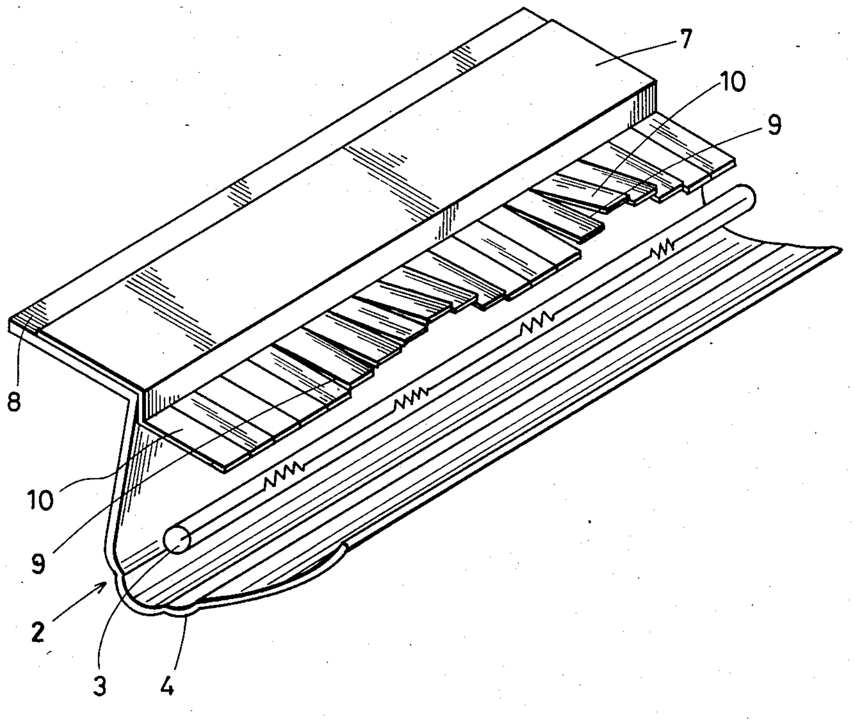
FIG. 4 shows a perspective view of the light limiting device of FIG. 3.

FIG. 3 shows a sectional view of the combination of light source unit 2 and the light limiting device comprising the plurality of blades 10. FIG. 4 shows a perspective view of the light limiting device comprising the plate 7 and the plurality of blades 10 as well as the light source unit 2.

Referring now to FIGS. 3 and 4, the light emitted by the lamp 3 is projected on the copy docuement on the table 1, directly and is also reflected by the bowl wall 4. The plurality of blades 10 can serve to interrupt the light from the lamp 2 toward the document. Since each one of the plurality of blades 10 is separated by the slits 9, each one of them can be adjusted to selectively interrupt the light from the lamp 2. When a selected blade is bent upwardly, a large amount of emitted light can pass through the opening of the bowl wall 4 toward the document. When the light from the lamp 2 is localized and not uniform, the bending of some blades 10 can uniformly the light over the entire surface of the document. In particular, the light intensity from the lamp 2 tends to be localized at the center of the document because of the variety in characteristics of the lamp 3 and the bowl 4. Before the copying machine is removed from the manufacturing line, the blades are adjusted by bending and, thereafter, fixed.

To minimize the distance between the document plate 1 and the drum carrying the optical-sensitive member 6, the rod lens array 5 is preferable. When the array 5 is positioned between the plate 1 and the drum, the positioning of any light limiting means such as the blades 10 should not be positioned between the plate 1 and the drum. In addition, when the rod lens array 5 is used to focus the light, it is preferable that light entering into the rod lens array 5 should be limited rather than to limit light passing through the rod lens array 5. For this reason, the light limiting device of the blades 10 should be positioned near the lamp 2 and in front of the plate 1 before the light is incident upon the rod lens array 5.

With the help of the positioning of the rod lens array 5 in the manner as described in FIGS. 1 and 2, it may be possible that the distance between the plate 1 and the drum is about 75.0 mm.

Of course, it may possible that the rod lenses array 5 is replaced by any conventional lenses or mirrors since the crux of the present invention is the configuration of the light limiting device.

While only certain embodiments of the present invention have been described, it will be apparent to those skilled in the art that various changes and modifications may be made therein without departing from the spirit and scope the present invention as claimed.

What is claimed is:

1. An electrophotographic copying machine comprising:

means for supporting a document to be copied;

a photoconductive image member;

an elongated light source for projecting light onto a surface of said document for reflection onto the photoconductive image member;

a bowl-shaped reflector extending the length of said elongated light source for projecting light onto said document; and a light limiting assembly positioned between said elongated light source and said document, said light limiting assembly including a plurality of discrete, separately adjustable light limiting blades disposed along the length of the elongated light source and supported on a portion of said bowl-shaped reflector;

whereby the amount of light incident on said document may be selectively varied along the length of said elongated light source by bending each of said separately adjustable light limiting blades to fixed positions with respect to the elongated light source.

2. The electrophotographic-copying machine of claim 1, further comprising an elongated rod lens array disposed between said docuement and photoconductive member for focusing the light reflected from said document onto said photoconductive member, said rod lens array being substantially the same length as said elongated light source and optically aligned therewith.

* * * * *